United States Patent
Jeong

(10) Patent No.: US 12,500,470 B2
(45) Date of Patent: Dec. 16, 2025

(54) ELECTRIC WATER PUMP

(71) Applicants: HYUNDAI MOTOR COMPANY, Seoul (KR); KIA CORPORATION, Seoul (KR)

(72) Inventor: Seong-Bin Jeong, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/630,211

(22) Filed: Apr. 9, 2024

(65) Prior Publication Data
US 2025/0088061 A1   Mar. 13, 2025

(30) Foreign Application Priority Data
Sep. 11, 2023   (KR) .................. 10-2023-0120239

(51) Int. Cl.
| | |
|---|---|
| *H02K 3/52* | (2006.01) |
| *B60H 1/00* | (2006.01) |
| *F04D 13/06* | (2006.01) |
| *F04D 29/42* | (2006.01) |
| *H02K 5/20* | (2006.01) |
| *H02K 9/19* | (2006.01) |
| *H02K 21/16* | (2006.01) |

(52) U.S. Cl.
CPC ......... *H02K 3/522* (2013.01); *B60H 1/00435* (2013.01); *F04D 13/06* (2013.01); *F04D 29/4293* (2013.01); *H02K 5/203* (2021.01); *H02K 9/19* (2013.01); *H02K 21/16* (2013.01); *H02K 2203/12* (2013.01)

(58) Field of Classification Search
CPC .......... H02K 3/522; H02K 5/203; H02K 9/19; H02K 21/16; H02K 2203/12; H02K 3/325; H02K 9/06; B60H 1/00435; B60H 1/3223; F04D 13/06; F04D 29/4293; F04D 13/064; F04D 13/08; F04D 13/0606; F04D 29/22; F04D 29/426
See application file for complete search history.

(56) References Cited

U.S. PATENT DOCUMENTS

| | | | |
|---|---|---|---|
| 8,839,503 B2 * | 9/2014 | Yi .......................... | F04D 25/06 310/216.008 |
| 9,768,657 B2 * | 9/2017 | Ogawa .................. | H02K 3/522 |
| 10,995,759 B2 * | 5/2021 | Pae ...................... | F04D 13/0606 |
| 11,028,852 B2 * | 6/2021 | Cho ........................ | H02K 5/225 |

(Continued)

*Primary Examiner* — Jesse S Bogue
(74) *Attorney, Agent, or Firm* — Lempia Summerfield Katz LLC

(57) ABSTRACT

An electric water pump may include: a housing with a cooling water inlet and a cooling water outlet; and a stator assembly provided inside the housing. The stator assembly includes a stator core, a stator coil arranged on the stator core, insulation members insulating the stator core and the stator coil, and a stator cover provided to cover the stator core, the stator coil, and the insulation members. The electric water pump further includes: a rotor assembly rotatably provided inside the stator assembly and having a magnetic body; and an impeller pumping cooling water introduced through the cooling water inlet by rotation of the rotor assembly. In particular, the stator core, the stator coil, and the insulation members of the stator assembly may be integrally formed in the stator cover.

4 Claims, 9 Drawing Sheets

(56) References Cited

U.S. PATENT DOCUMENTS

| | | | |
|---|---|---|---|
| 12,078,191 B2* | 9/2024 | Wang | F04D 29/406 |
| 2007/0069841 A1* | 3/2007 | Kusano | H02K 3/522 |
| | | | 335/202 |
| 2010/0264774 A1* | 10/2010 | Tokunaga | H02K 3/522 |
| | | | 310/215 |
| 2017/0257001 A1* | 9/2017 | Kamiya | H02K 3/12 |
| 2022/0278583 A1* | 9/2022 | Aoyagi | H02K 3/522 |
| 2022/0399768 A1* | 12/2022 | Aso | F04D 13/0633 |
| 2024/0266891 A1* | 8/2024 | Ochiai | H02K 15/026 |

* cited by examiner

ELECTRIC WATER PUMP

CROSS-REFERENCE TO RELATED APPLICATION

This application claims priority to and the benefit of Korean Patent Application No. 10-2023-0120239, filed in the Korean Intellectual Property Office on Sep. 11, 2023, the entire contents of which are incorporated herein by reference.

BACKGROUND (a) Field

The present disclosure relates to an electric water pump.

(b) Description of the Related Art

In general, an air conditioning system applied to eco-friendly vehicles is commonly called a heat pump system.

The heat pump system is equipped with an electric water pump that pumps cooling water. The electric water pump pumps cooling water while an impeller is rotated by power generated by a driving motor operated by electric energy.

In order to ensure insulation of coils of the driving motor again the cooling water, and to prevent the coils of the driving motor to corrode due to the cooling water, a waterproof cover is provided. The waterproof cover prevents the cooling water from being introduced into the coils of the driving motor.

The waterproof cover interrupts the cooling water from being introduced between coils wound on a stator of the driving motor and a rotor with a magnetic body.

However, when the waterproof cover is provided between the stator and the rotor of the driving motor, an air gap between the stator and the rotor increases. As a result, there is a problem in that the performance of the electric water pump deteriorates.

Further, an axial size and a radial size of the electric water pump increases due to the presence of the waterproof cover. There is a problem in that it is difficult to secure a package space in a limited space inside the vehicle.

The above information disclosed in this Background section is provided only to enhance understanding of the background of the present disclosure. Therefore, the Background section may contain information that does not form the prior art that is already known to a person of ordinary skill in the art.

SUMMARY

The present disclosure has been made in an effort to provide an electric water pump capable of enhancing performance by minimizing an air gap formed between a stator and a rotor.

In an embodiment of the present disclosure, an electric water pump may include: a housing with a cooling water inlet and a cooling water outlet; and a stator assembly provided inside the housing. The stator assembly may include: a stator core, and a stator coil arranged on the stator core; and insulation members insulating the stator core and the stator coil. The stator assembly may further include: a stator cover provided to cover the stator core, the stator coil, and the insulation members. The electric water pump further includes an impeller and a rotor assembly rotatably provided inside the stator assembly. The rotor assembly may include a magnetic body, and the impeller is configured to pump cooling water introduced through the cooling water inlet by rotation of the rotor assembly. In particular, the stator core, the stator coil, and the insulation members of the stator assembly may be integrally formed in the stator cover.

In some embodiments, the stator core may include at least one stator slot configured to receive the stator coil, and at least one stator tooth around which the stator coil is wound. The at least one tooth is arranged along a circumferential direction of the stator core. In particular, a radial inner end of the stator tooth may be exposed to a radial inner side of the stator cover toward the magnetic body of the rotor assembly.

In some embodiments, the radial inner end of the stator tooth may protrude on the radial inner side of the stator cover by a set amount.

In some embodiments, the stator coil may be wound on the stator tooth, and then the stator cover may be manufactured through injection.

In some embodiments, the insulation members may include an upper insulation member provided at an upper portion of the stator core, and a lower insulation member provided at a lower portion of the stator core.

According to embodiments, a waterproof cover in the related art is removed to reduce an axial size and a radial size of an electric water pump, and packaging in a limited space of a vehicle can be advantageous.

Further, an air gap between a stator teeth of a stator assembly and a magnetic body of a rotor assembly can be minimized, and efficiency of a driving motor can be enhanced.

Besides, an effect which can be obtained or predicted by the embodiments of the present disclosure is directly or implicitly disclosed in detailed description of the embodiments of the present disclosure. In other words, various effects predicted according to the embodiments of the present disclosure are disclosed in the detailed description to be described below.

BRIEF DESCRIPTION OF THE DRAWINGS

These drawings are for the purpose of describing an exemplary embodiment of the present disclosure, and therefore the technical spirit of the present disclosure should not be construed as being limited to the accompanying drawings.

Figure 1:
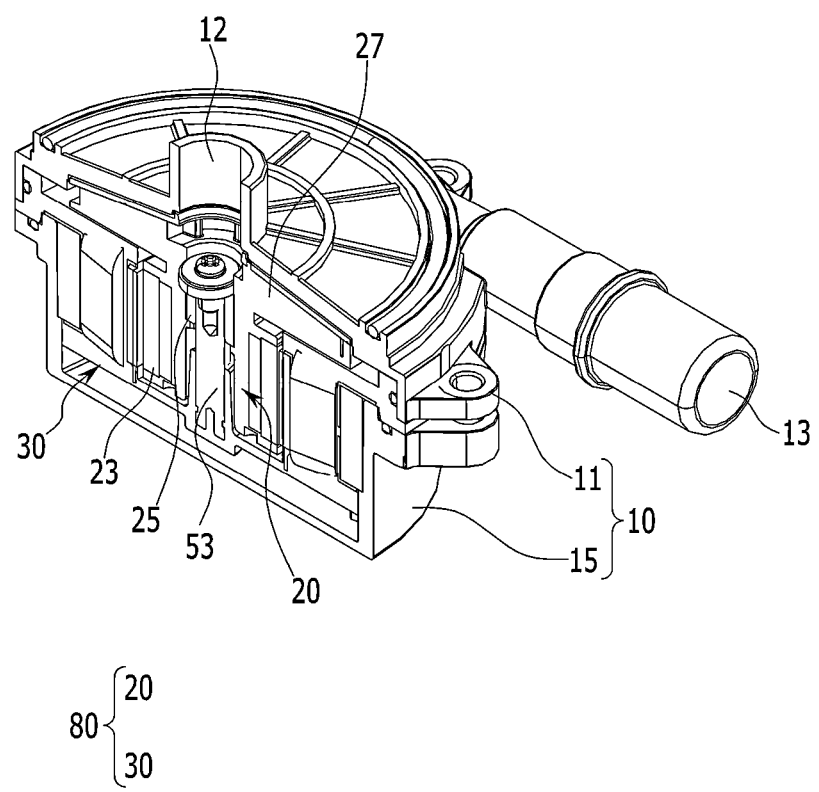
FIG. 1 is a cross-sectional perspective view illustrating a configuration of an electric water pump according to an embodiment.

The drawings referenced above are not particularly illustrated according to a scale, but should be understood as presenting a somewhat brief expression of various features that illustrate the basic principles of the present disclosure. For example, the specific design features of the present disclosure, including specific dimensions, directions, positions, and shapes, should be partially determined by specific intended applications and use environments.

DETAILED DESCRIPTION

The terms used here are only for describing specific embodiments, and are not intended to limit the present disclosure thereto. As used here, the singular forms are also intended to include plural forms, unless they are explicitly differently indicated by context. It should be appreciated that when terms "include" and/or "including" are used in this specification, the terms "include" and/or "including" are intended to designate the existence of mentioned features, integers, steps, operations, constituent elements, and/or components, but do not exclude the existence or addition of one or more other features, integers, operations, constituent elements, and components, or groups thereof. As used herein, the terms "and/or" include any one or all combinations of the items which are associated and listed.

By referring to the accompanying drawings, the present disclosure is described in detail so as to be easily carried out by those having ordinary skill in the art in a technical field to which the present disclosure pertains. However, the present disclosure can be realized in various different forms, and is not limited to the specific embodiments described herein.

A part irrelevant to the description has been omitted to clearly describe the present disclosure, and the same or similar elements are designated by the same reference numerals throughout the specification.

Further, since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

Suffixes "module" and/or "unit" for components used in the following description are given or mixed in consideration of easy preparation of the present disclosure only and do not have their own distinguished meanings or roles.

Further, in describing specific embodiments, a detailed description of related known technologies has been omitted if it is determined that the detailed description makes the gist of the embodiments of the present disclosure unclear.

Further, the accompanying drawings are provided for helping to easily understand embodiments disclosed in the present specification, and the technical spirit disclosed in the present specification is not limited by the accompanying drawings, and it should be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one component from another component.

In the description below, the expression described by the singular can be interpreted as a singular or plurality, unless an explicit expression such as "one" or "single" is used.

When a component, device, element, or the like of the present disclosure is described as having a purpose or performing an operation, function, or the like, the component, device, or element should be considered herein as being "configured to" meet that purpose or to perform that operation or function.

It should be understood that, when it is described that a component is "connected to" or "accesses" another component, the component may be directly connected to or access the other component or a third component may be present therebetween.

In contrast, when it is described that a component is "directly connected to" or "directly accesses" another component, it is understood that no element is present between the element and another element.

Hereinafter, an electric water pump according to an embodiment is described in detail with reference to the accompanying drawings.

FIG. 1 is a partial cross-sectional perspective view illustrating a configuration of an electric water pump according to an embodiment. In addition, FIG. 2 is an exploded perspective view illustrating the configuration of the electric water pump according to an embodiment.

Figure 2:
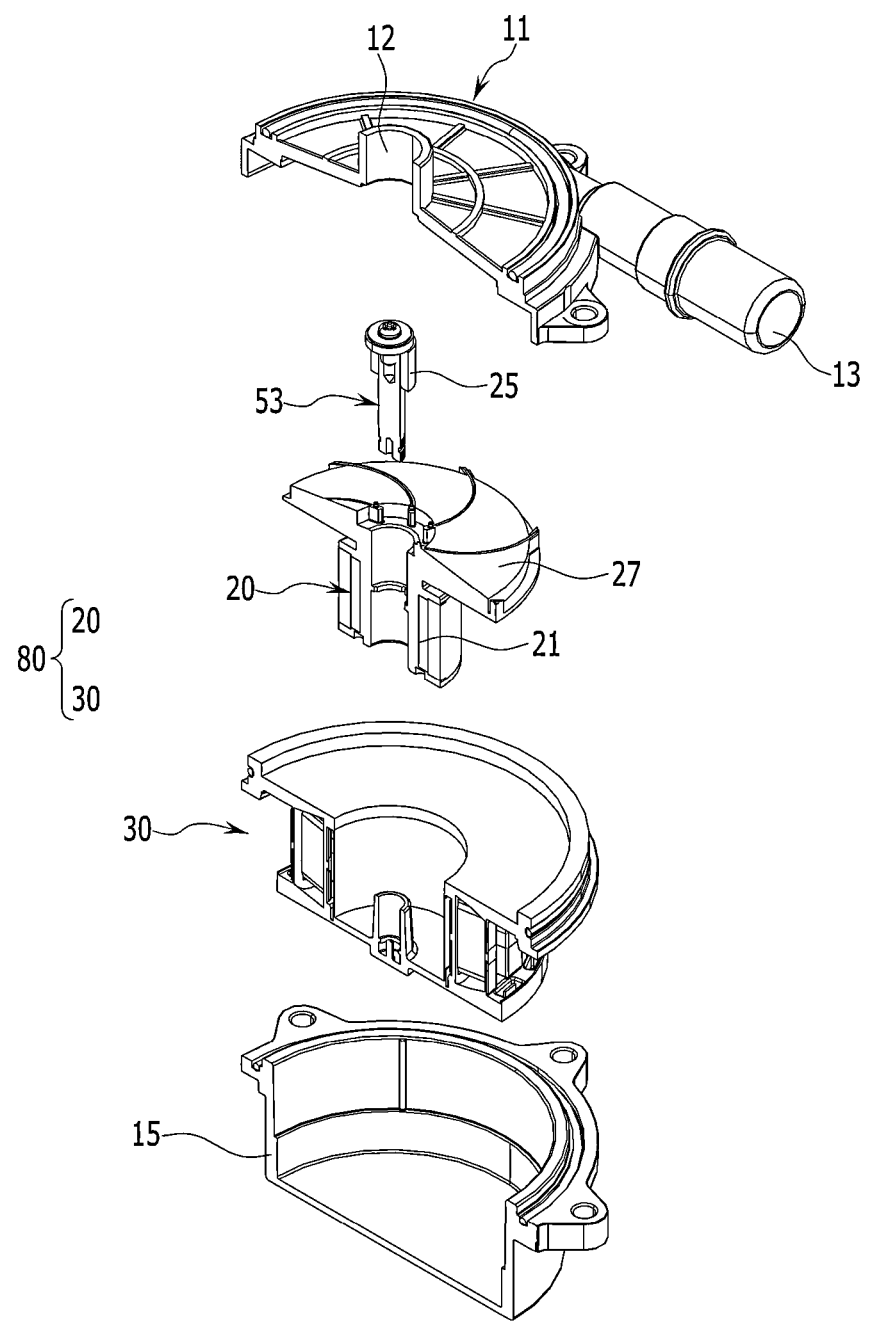
FIG. 2 is an exploded perspective view illustrating the configuration of the electric water pump according to an embodiment.

As illustrated in FIGS. 1 and 2, the electric water pump may include a housing 10 with a cooling water inlet 12 and a cooling water outlet 13, an impeller 27 provided inside the housing 10, and a driving motor 80 including a rotor assembly 20 and a stator assembly 30 (hereinafter, referred to as 'stator' as necessary).

The housing 10 may include an upper housing 11 and a lower housing 15. The upper housing 11 is formed in an approximately hollow cylindrical shape, and a lower portion is opened. The lower housing 15 is formed in an approximately hollow cylindrical shape, and an upper portion is opened. The impeller 27, and the driving motor 80 including the stator assembly 30 and the rotor assembly 20 may be provided in an inner space formed by coupling the upper housing 11 and the lower housing 15.

A cooling water inlet 12 through which cooling water is introduced may be formed at an upper center of the upper housing 11, and a cooling water outlet 13 through which the cooling water is discharged may be formed on a side surface of the upper housing 11. A sealing member may be provided between a radial outer lower portion of the upper housing 11 and a radial outer upper portion of the lower housing 15. When the upper housing 11 and the lower housing 15 are coupled, cooling water may be prevented from being leaked to the outside of the housing 10 by the sealing member.

The driving motor 80 includes the stator assembly 30 and the rotor assembly 20, and generates power for actuating the impeller 27 by an electromagnetic action with the stator assembly 30 and the rotor assembly 20.

Figure 3:
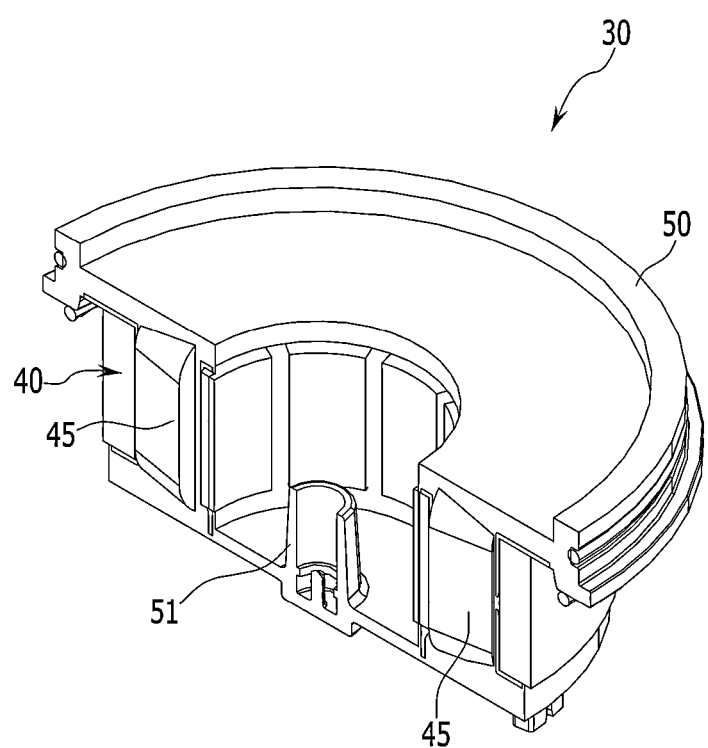
FIG. 3 is a cross-sectional perspective view illustrating a configuration of a stator assembly according to an embodiment.

FIG. 3 is a partial cross-sectional perspective view illustrating a configuration of the stator assembly 30 according to an embodiment. In addition, FIG. 4 is an exploded perspective view illustrating the configuration of the stator assembly 30 according to an embodiment.

Figure 4:
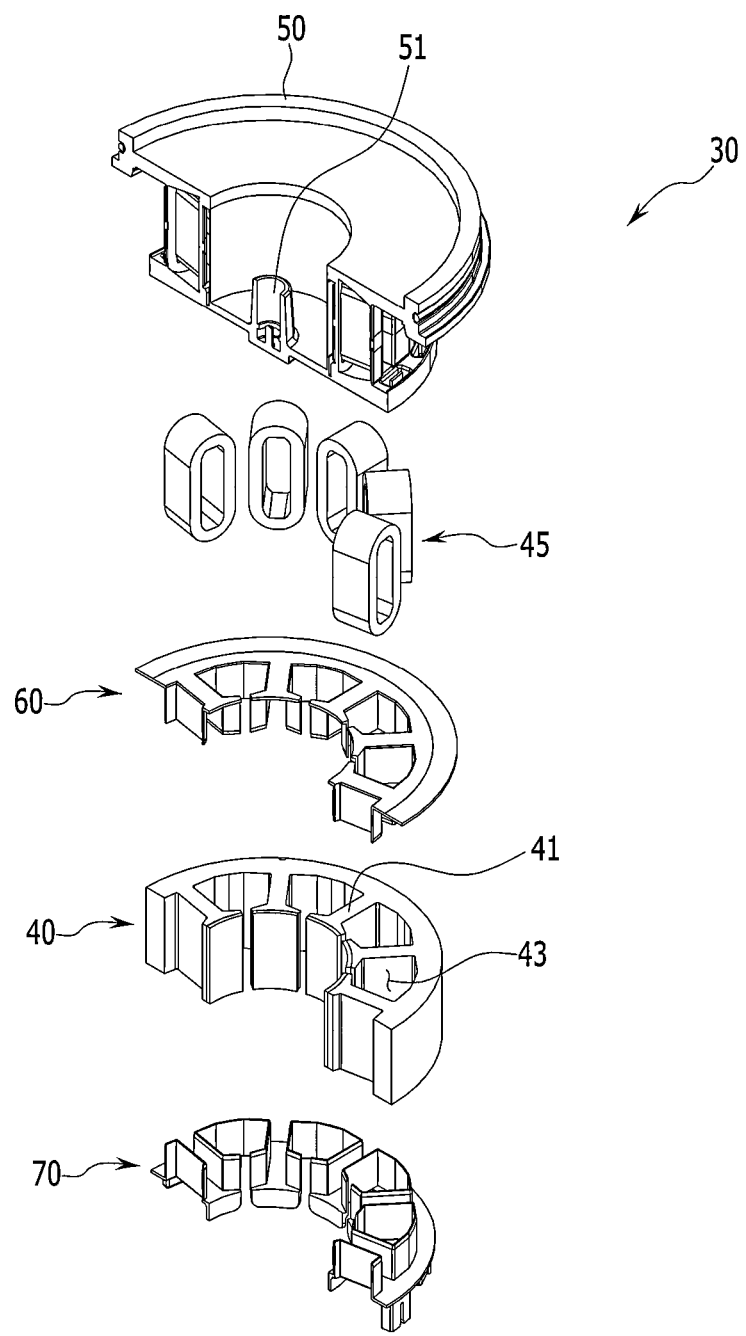
FIG. 4 is an exploded perspective view illustrating the configuration of the stator assembly according to an embodiment.

Referring to FIGS. 3 and 4, the stator assembly 30 may include a stator core 40, a stator coil 45 wound on the stator core 40, insulation members 60 and 70 insulating the stator core 40 and the stator coil 45, and a stator cover 50.

The stator core 40 may be formed in an approximately circular ring shape, and made of a metallic material so as to sufficiently form a rotating magnetic field. At least one stator slot 43 may be formed in a circumferential direction of the stator core 40, and one or more stator teeth 41 may be disposed along the circumferential direction of the stator core 40. The stator teeth 41 may be extended in a radial direction of the stator core 40, and a radial inner end of the stator teeth 41 may be expanded to both sides along the circumferential direction. As shown in FIG. 4, a plurality of stator slots 43 is provided in the circumferential direction of the stator core 40, and at least one stator tooth 41 is arranged between adjacent stator slots 43. In the same manner, the respective stator teeth 41 are arranged between corresponding adjacent stator slots 43. (See, FIG. 4). The stator coil 45 is wound around the corresponding stator tooth 41. The number of stator teeth 41 may be appropriately adjusted as necessary for stable driving characteristics of the driving motor 80.

The insulation members 60 and 70 may include an upper insulation member 60 provided at an upper portion of the stator core 40 and a lower insulation member 70 provided at a lower portion of the stator core 40. The upper insulation member 60 may be formed in a shape corresponding to the upper portion of the stator core 40 and the lower insulation member 70 may be formed in a shape corresponding to the lower portion of the stator core 40. The upper insulation member 60 and the lower insulation member 70 are disposed at the upper portion and the lower portion of the stator core 40, respectively and then the stator coil 45 is wound on the stator teeth 41. The upper insulation member 60 and the lower insulation member 70 electrically insulate the stator core 40 and the stator coil 45.

The stator cover 50 is provided to cover the stator core 40, the upper insulation member 60, the lower insulation member 70, and the stator coil 45 overall. The stator core 40, the stator coil 45, and the upper and lower insulation members 60 and 70 of the stator assembly 30 may be integrally formed in the stator cover 50.

To this end, in the stator cover 50, the upper insulation member 60 is disposed at the upper portion of the stator core 40, the lower insulation member 70 is disposed at the lower portion of the stator core 40, and then the stator coil 45 is wound on the stator core 40. The stator core 40 on which the stator coil 45 is wound is integrally injected to confirm the stator cover 50. The stator cover 50 is formed in an approximately circular ring shape, has a mounting space at a center so that the rotor assembly 20 is rotatably provided, and has a cover protrusion 51 to which a central shaft 53 is coupled formed at a lower center.

When the stator cover 50 is injection-molded, the radial inner end of the stator teeth 41 of the stator core 40 may be exposed to the radial inner side of the stator cover 50. In an embodiment, the radial inner end of the stator teeth 41 may be formed to protrude on the radial inner side of the stator cover 50 by a set amount. Since the radial inner end of the stator teeth 41 protrudes on the radial inner side of the stator cover 50, the air gap formed between the stator teeth 41 and the magnetic body 23 of the rotor assembly 20 may be minimized, and ad a result, the efficiency of the driving motor 80 may be enhanced.

Referring back to FIGS. 1 and 2, the rotor assembly 20 is rotatably provided at a center of the stator cover 50. The rotor assembly 20 is installed at an inner center of the stator assembly 30, and rotated by an electromagnetic action with the stator coil 45 wound on the stator core 40.

The rotor assembly 20 may include a rotor body 21, and at least one magnetic body 23 provided in the rotor body 21.

The stator body 21 is formed in an approximately hollow cylindrical shape, and rotatably provided on a central shaft 53 fixedly installed at the cover protrusion 51 of the start cover 50. A bearing 25 may be provided between the central shaft 53 installed in the stator cover 50 and the rotor body 21. In other words, the rotor body 21 of the rotor assembly 20 is rotatably supported on the central shaft 53 through the bearing 25.

At least one magnetic body 23 is provided at the radial outer side of the rotor body 21. The magnetic body 23 may be a permanent magnet. A plurality of magnetic bodies 23 may be provided in the circumferential direction of the rotor body 21.

According to an embodiment, the driving motor 80 is implemented as a radial flux motor (RFM) having the stator core 40 of the stator assembly 30, and the magnetic body 23 of the rotor assembly 20 at the radial inner side of the stator core 40. The RFM is an electric motor in which a flux generated from a magnetic body of a rotor heads to the radial direction.

The magnetic body 23 provided in the rotor assembly 20 and the radial inner end of the stator teeth 41 of the stator core 40 are provided to be spaced apart from each other by a predetermined interval. The magnetic body 23 of the rotor assembly 20 and the radial inner end of the stator teeth 41 are spaced apart from each other to form the air gap. As a distance of the air gap decreases, the efficiency of the driving motor 80 including the rotor assembly 20 and the stator is enhanced.

The impeller 27 may be provided at the upper portion of the rotary body 21 of the rotor assembly 20. The impeller 27 rotates with the rotation of the rotor assembly 20, and pumps the cooling water introduced through the cooling water inlet 12 formed in the housing 10, and the cooling water pumped by the impeller 27 is discharged to the outside through the cooling water outlet 13. In an embodiment, it is described as an example that the rotor shaft 21 of the rotor assembly 20 and the impeller 27 are integrally provided, but the present disclosure is not particularly limited thereto, and the rotor assembly 20 and the impeller 27 may also be formed as separate components.

Figure 5:
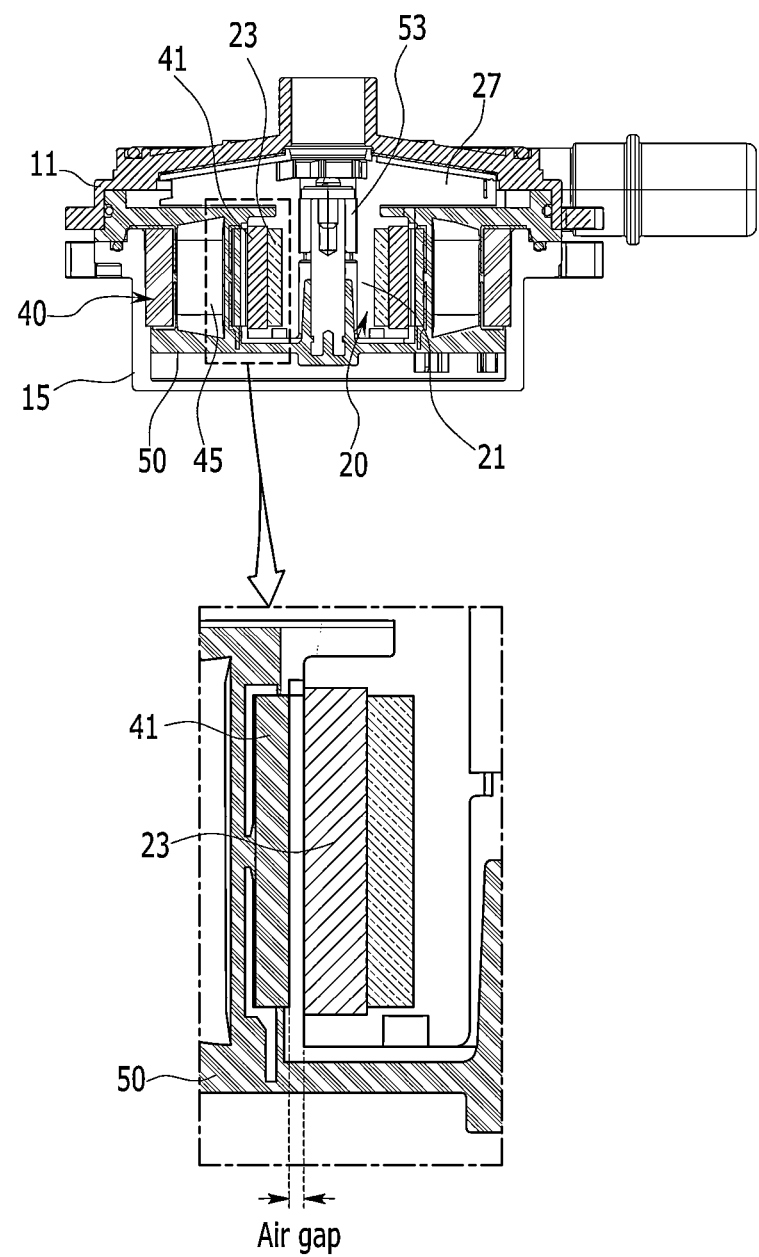
FIG. 5 is a cross-sectional view illustrating the configuration of the electric water pump according to an embodiment.
Figure 6:
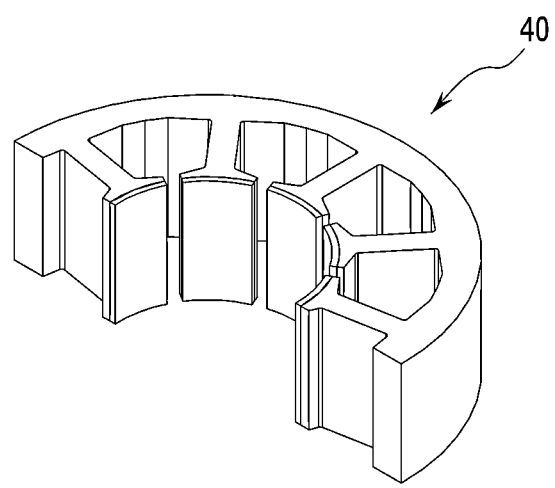
FIGS. 6 to 9 are diagrams describing a method of manufacturing a stator assembly of a driving motor according to an embodiment.

Referring to FIG. 5, a conventional waterproof cover is removed from the driving motor 80 embedded in the electric water pump according to an embodiment.

In the related art, the air gap formed between the stator assembly 30 and the rotor assembly 20 of the driving motor 80 is formed in approximately 2 mm by the waterproof cover. However, by removing the waterproof cover in the related art, according to an embodiment of the present disclosure, the air gap between the stator assembly 30 and the rotor assembly 20 of the driving motor 80 may be formed in less than approximately 1 mm (substantially, approximately 0.5 mm). As such, the air gap between the stator assembly 30 and the rotor assembly 20 is minimized to enhance the efficiency and output of the driving motor 80 embedded in the electric water pump.

Referring to FIGS. 6 to 9, a method for manufacturing a stator assembly 30 is described in detail.

Figure 7:
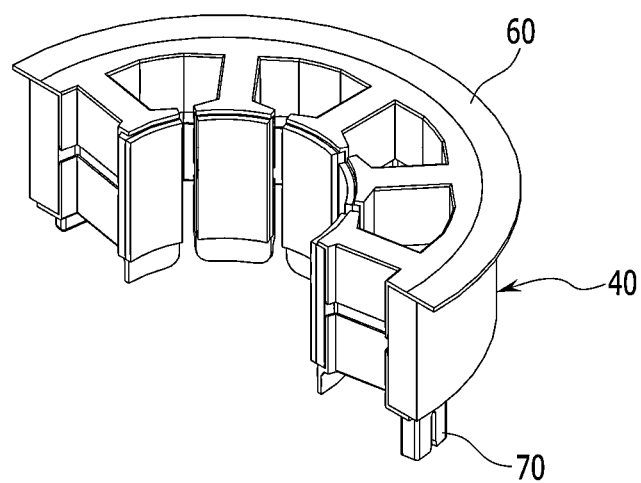

A stator core 40 is located at a set position (see FIG. 6), and an upper insulation member 60 and a lower insulation member 70 are disposed at an upper portion and a lower portion of the stator core 40, respectively (see FIG. 7).

Figure 8:
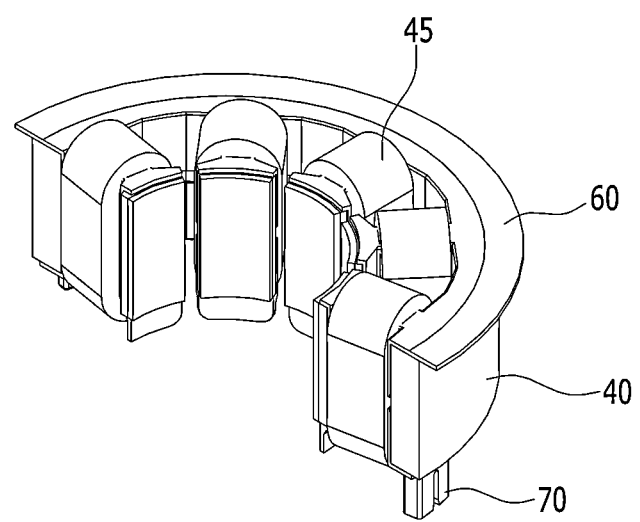

After the stator core 40, the upper insulation member 60, and the lower insulation member 70 are disposed, a stator coil 45 is wound on a stator teeth 41 (see FIG. 8). The number of the stator coils 45 may be the same as the number of stator teeth 41. In other words, the number of stator teeth 41 is equal to the number of stator coils 45, and the stator coils 45 are wound on the stator teeth 41, respectively.

Figure 9:
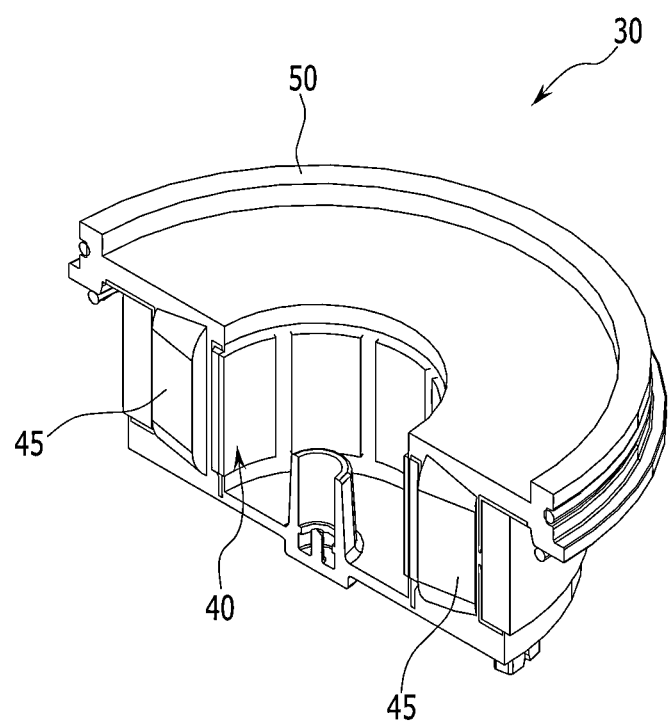

The stator coil 45 is wound around the stator tooth 41, and then a stator cover 50 is formed by injection molding (see FIG. 9).

As such, the stator core 40 and the stator coil 45 are provided inside the stator cover 50. As a result, the stator core 40 and the stator coil 45 may be prevented from corroded due to cooling water introduced into a housing 10. Thus, a function of a waterproof cover in the related art is replaced with the stator cover 50, thereby reducing an axial size and a radial size of the electric water pump. Further, an air gap between the stator assembly 30 and the rotor assembly 20 is minimized. It enhances the efficiency of the driving motor 80.

Although embodiments of the present disclosure have been disclosed for illustrative purposes, those having ordinary skill in the art should appreciate that various modifications, additions and substitutions are possible, without departing from the scope and spirit of the present disclosure. The scope of the present disclosure is defined by the accompanying claims and their equivalents.

Description of Symbols

- 10: Housing
- 11: Upper housing
- 12: Cooling water inlet
- 13: Cooling water outlet
- 15: Lower housing
- 20: Rotor
- 21: Rotor body
- 23: Magnetic body
- 25: Bearing
- 27: Impeller
- 30: Stator assembly
- 40: Stator core
- 41: Stator teeth
- 43: Stator slot
- 45: Stator coil
- 50: Stator cover
- 51: Cover protrusion
- 53: Central shaft
- 60: Upper insulation member
- 70: Lower insulation member
- 80: Driving motor

What is claimed is:

1. An electric water pump comprising:
 a housing with a cooling water inlet and a cooling water outlet;
 a stator assembly provided inside the housing, wherein the stator assembly includes:
 a stator core,
 a stator coil arranged on the stator core,
 insulation members insulating the stator core and the stator coil, and
 a stator cover provided to cover the stator core, the stator coil, and the insulation members;
 a rotor assembly rotatably provided inside the stator assembly, and having a magnetic body; and
 an impeller configured to pump cooling water introduced through the cooling water inlet by rotation of the rotor assembly,
 wherein the stator core includes:
 at least one stator slot configured to receive the stator coil, and
 at least one stator tooth around which the stator coil is wound, the at least one stator tooth configured to be arranged along a circumferential direction of the stator core, and
 wherein a radial inner end of the at least one stator tooth is exposed to a radial inner side of the stator cover toward the magnetic body of the rotor assembly, wherein the radial inner end of the at least one stator tooth protrudes on the radial inner side of the stator cover.

2. The electric water pump of claim 1, wherein the radial inner end of the at least one stator tooth protrudes on the radial inner side of the stator cover by a set amount.

3. The electric water pump of claim 1, wherein:
 the stator coil is wound on the at least one stator tooth, and then the stator cover is manufactured through injection.

4. The electric water pump of claim 1, wherein the insulation members include:
 an upper insulation member provided at an upper portion of the stator core, and
 a lower insulation member provided at a lower portion of the stator core.

* * * * *